United States Patent [19]
Husse et al.

[11] Patent Number: 6,006,883
[45] Date of Patent: Dec. 28, 1999

[54] FRICTION CLUTCH

[75] Inventors: Ulrich Husse; Lutz Leimbach, both of Schweinfurt; Joachim Lindner, Dittelbrunn; Thomas Wirth, Schwanfeld, all of Germany

[73] Assignee: Mannesmann Sachs AG, Schweinfurt, Germany

[21] Appl. No.: 08/994,206

[22] Filed: Dec. 19, 1997

[30] Foreign Application Priority Data

Dec. 20, 1996 [DE] Germany ............................ 196 53 391
Dec. 11, 1997 [DE] Germany ............................ 197 55 081

[51] Int. Cl.⁶ ............................. F16D 13/48; F16D 13/71
[52] U.S. Cl. .................................. 192/70.23; 192/70.29; 192/84.6; 192/93 A; 192/99 A; 192/101
[58] Field of Search .............................. 192/70.23, 70.24, 192/70.29, 70.3, 89.21, 93 R, 93 A, 99 R, 99 A, 101, 84.6

[56] References Cited

U.S. PATENT DOCUMENTS

| | | | |
|---|---|---|---|
| 1,861,253 | 5/1932 | Wemp | .................................. 192/99 R |
| 2,061,990 | 11/1936 | Tyler | ................................ 192/70.24 X |
| 4,895,235 | 1/1990 | Nishimura et al. . | |
| 4,895,236 | 1/1990 | Sakakibara et al. . | |
| 5,372,106 | 12/1994 | Botterill | .............................. 192/84.6 X |

FOREIGN PATENT DOCUMENTS

| | | |
|---|---|---|
| 42 39 289 | 5/1993 | Germany . |
| 44 07 665 | 9/1995 | Germany . |
| 44 14 033 | 10/1995 | Germany . |
| 1 166 337 | 10/1969 | United Kingdom . |

*Primary Examiner*—Richard M. Lorence
*Attorney, Agent, or Firm*—Cohen, Pontani, Lieberman & Pavane

[57] ABSTRACT

A friction clutch with at least one flywheel mass and a clutch housing with which there is associated a pressing arrangement for a pressing plate which is provided for the action of pressure on one side of a clutch disk the opposite side of which is supported on a counter pressure surface. Furthermore, a disengager is provided by which, upon its movement, the pressing arrangement can be functionally connected with or separated from the clutch disk. The disengager is connected by a disengagement mechanism to the pressing plate by which the movement of the disengager can be transformed into an axial movement of the pressing plate.

15 Claims, 9 Drawing Sheets

FRICTION CLUTCH

BACKGROUND OF THE INVENTION

1. Field of the Invention

The present invention relates to a friction clutch.

2. Discussion of the Prior Art

From German reference 44 14 033 A1, a friction clutch is known that has a clutch housing which is ordinarily provided on a flywheel mass. With the clutch housing there is associated a pressing means, in the form of a diaphragm spring, for a pressing plate which is provided in order to apply pressure to one side of a clutch disk. The opposite side of the clutch disk rests, in customary manner, against a counter pressure surface. The radially inner ends of the pressing means are functionally connected with the disengagement bearing of a disengager which may be constructed in accordance with German reference 44 07 665 A1. With such a disengager, which operates hydraulically, when a piston is acted on by pressure, it is moved out in the direction towards the pressing means. The pressing means is thus deformed and thereby functionally connected to or disconnected from the clutch disk via the pressing plate.

These friction clutches have the disadvantage that for each retraction or extension, the pressing means must always be considerably changed with respect to its state of deformation and/or in its position, which, insofar as the pressing means is a diaphragm spring, always goes hand in hand with a change in the tension thereof. Upon this deformation of the pressing means, considerable work must be applied via the disengager. Since the disengager must generally be operated by the driver by means of a foot pedal, the driver must either apply a high actuating force or corresponding step-up means must be provided in the engagement or disengagement path, which has a detrimental effect on the disengagement path within the friction clutch. This problem can be further increased in case of wear by the fact that the pedal forces to be applied by the driver can further increase as a result of the wear curve of a diaphragm spring. Accordingly, if the driver is to be spared this, an expensive wear compensation must be provided, which is either arranged in the friction clutch and acts mechanically in accordance with the wear compensation described in German reference 42 39 289 A1, or else a hydraulic wear compensation is provided within the disengagement system. Viewed as a whole, the force to be applied by the driver may be maintained somewhat constant by these measures, but the high technical expense and the deformation work which must nevertheless be performed on the pressing means remains.

SUMMARY OF THE INVENTION

Accordingly, it is an object of the present invention to provide a friction clutch having a disengager so that, upon engagement or disengagement, the work to be applied is minimal.

Pursuant to this object, and others which will become apparent hereafter, one aspect of the present invention resides in a friction clutch comprised of at least one flywheel mass having a counter pressure surface, a clutch housing mounted to the flywheel mass, a pressing plate arranged in the clutch housing, a clutch disk arranged between the pressing plate and the flywheel mass, means for pressing the pressing plate against the counter pressure surface, a disengager assembly operatively arranged to move the pressing plate so as to selectively functionally connect and separate the pressing means and the clutch disk, a disengagement mechanism that connects the disengager assembly with the pressing plate, the disengagement mechanism including a moveable pressure element, and a movement part operatively arranged to move the disengagement mechanism so that the pressure element engages the pressing plate, whereby the pressure element is moved out of a first position, in which a pressing force of the pressing means is blocked from the pressing plate, into a second position in which the pressure element conducts the pressing force from the pressing means to the pressing plate.

By having the disengagement mechanism of the invention operate so that a pressing force supplied continuously by the pressing means is, in a first position of the disengagement mechanism, kept away from the pressing plate and, in a second position, is transmitted to the pressing plate, the result is obtained that the engagement or disengagement process can be carried out without thereby subjecting the pressing means to any substantial change in deformation and/or position. Since the pressing means is nevertheless continuously prestressed during the entire disengagement or engagement and thus remains active, no deformation work need be introduced into the friction clutch by the disengager. Instead of this, only the movement introduced into the disengagement mechanism via the movement part of the disengager is introduced as work in order to carry out the engagement or disengagement, this work being very slight as compared with the work which ordinarily is to be performed on the pressing means for a change in the position and/or shape. This is due to the fact that the energy contained in the pressing means, which remains under stress, is conducted merely as a function of position to or away from the pressing plate, but is not withdrawn as a whole from the friction clutch. Accordingly, in each case, just that amount of energy is fed so that the displacement movement can take place on the disengagement mechanism. This energy is applied essentially in order to overcome frictional losses. With a low-friction construction of the disengagement mechanism, due for instance to the installation of anti-friction bearings at problematic places, the energy required can be reduced to a negligibly small amount. In this way, an extremely small actuating drive, for instance in the form of an electric motor, is sufficient in order to drive the movement part of the disengagement mechanism. Such small actuating drives, due to their slight inertia, can be highly accelerated within a very short period of time, as a result of which a very rapid engagement or disengagement can be effected. Furthermore, due to the slight amount of work to be applied, gear transmissions can be dispensed with, so that the friction clutch can be of very simple construction. Furthermore, without such gear transmissions, in view of the small forces, any possible wear cannot be noted by the driver on the friction linings of the friction clutch, in particular when the foot pedal used by him is to be connected by an electric line and a control to the actuating drive which is constructed as an electric motor.

It should not go unmentioned that the above-described advantage of the friction clutch of the invention, namely the small amount of work or energy to be applied for engagement or disengagement is optimum when the movement introduced into the disengagement mechanism is perpendicular to the direction of action of the pressing force produced by the pressing means, since, in this case, the process of engagement or disengagement results in the smallest possible change in deformation and/or position of the pressing means, and in the ideal cases no change at all.

As previously mentioned, an object of the present invention is to reduce to a minimum the high disengagement forces necessary in traditional friction clutches resulting from the deformation of a diaphragm spring effected for the disengagement, so that the possibility is created of carrying out coupling processes by means of actuating drives of light construction or keeping the manual actuating force to be applied by the driver as small as possible.

Therefore, in accordance with another aspect of the present invention, a friction clutch is proposed which comprises a clutch disk which, by means of a force accumulator, preferably a diaphragm spring, coil spring or the like, can be pressed against a counter pressure surface. A force-transmitting lever arrangement is arranged in the force-transmission path between the force accumulator and the clutch disk and has at least one first lever region associated with the force accumulator and at least one second lever region associated with the clutch disk. For carrying out the engagement and disengagement processes, a lever ratio of a lever length of the at least one first lever region to a lever length of the at least one second lever region is variable.

With a friction clutch constructed in this manner, the pressure force actually applied to the clutch disk can be changed merely by changing the lever lengths and thus reduced to such an extent that, in the extreme case, i.e. the case of disengagement, the clutch disk is no longer acted upon substantially by the force accumulator and is thus released.

This can be done in the manner that in order to change the lever ratio, the lever length of the at least one first lever region and/or of the at least one second lever region is variable.

The at least one first lever region and the at least one second lever region are preferably provided on at least one swingably arranged lever element.

A very efficient transmission of force with a simple construction is obtained if, at least in an engaged condition of the friction clutch, in each case the first lever region and the second lever region are arranged on the same side with respect to a region of swing of the at least one lever element.

For the carrying out engagements and disengagements, in another embodiment in order to change the lever ratio, a distance between the region of swing of the at least one lever element and a support region of the force accumulator on the at least one lever element is variable. It may, however, be mentioned here that it is nevertheless possible also to change the axial distance between the region of swing of the at least one lever element and a support region by which the at least one lever element acts on the clutch disk or an interposed component.

The force accumulator is preferably supported on the at least one lever element via a support element and the support element is displaceable along a displacement path on the at least one lever element in order to change the lever ratio.

As already mentioned, one essential aspect of the present invention is to keep the force necessary for actuating the clutch of the invention as small as possible. This also means that it must ensured that, independently of the different conditions of actuation, no force need be exerted in order to hold the clutch in a condition of actuation. In order to achieve this, the displacement path has a course that for all regions of the displacement path, upon support in a corresponding one of the regions, a tangential line to the displacement path. The tangential line extends approximately in the direction of displacement and is substantially perpendicular to the direction of action of a force, in which a supporting force of the force accumulator acts on the corresponding region. Such a construction has the result that, in each condition of positioning of the clutch, i.e. in every support region, there is no component of force, which has the result that a positive relative movement is caused between the support element and the displacement path, with corresponding displacement of the clutch. However, it is pointed out that, under certain conditions, it may be desirable to provide such an automatic displacement of the support element, and thus movement of the clutch, in one direction, for instance in the direction towards the engaged condition. This contains, on the one hand, a safety aspect since, for instance, in the event of a failure of an actuating drive, the clutch passes positively into its engaged position. In addition to this, with a construction of the clutch in which the actuation takes place manually without the interpositioning of actuating drives, such a construction is advantageous since, after disengagement and the following release of the clutch pedal, the clutch again passes automatically into its engaged condition.

In order to realize the above-mentioned feature that no automatic displacement of the clutch into any position takes place, in another embodiment the displacement path has a curved course in the direction of displacement, preferably a circularly curved path.

The at least one lever element is constructed so that its thickness increases in the direction away from the region of swing. This increase in thickness is such that the thickness increases in accordance with the curved course of the displacement path for the support element.

The actuation of the clutch can be designed so that the support element is substantially stationary with respect to the force accumulator and so that the displacement of the support element can be produced by movement, preferably rotation, of the force accumulator. In other words, for the engagement and disengagement the entire force accumulator is displaced in a movement unit with the support element.

As an alternative, however, it is also possible for the support element to be displaceable for displacement along the displacement path with respect to the at least one lever element and with respect to the force accumulator.

In order to assure a complete release from load of the clutch disk in the disengaged condition, in a further embodiment, in the disengaged condition, a lever length of the first lever region lies within the region of zero.

As an alternative, or in addition to this, it can be provided that, in a disengaged condition of the friction clutch, the first lever region is arranged, with respect to a region of swing of the at least one lever element, on a different side than the second lever region. This arrangement has the result that, optionally, the lever is moved away from the clutch disk and releases it.

The at least one lever element is preferably held swingably on a component which is substantially non-displaceable with respect to the counter pressure surface in the direction of the introduction of force by the force accumulator.

In accordance with another embodiment of the present invention, a friction clutch is provided which comprises a clutch disk that can be pressed against a counter pressure surface by a force accumulator, preferably a diaphragm spring, coil spring or the like, and a transmission system arranged in the force transmission path of the force accumulator. With such a friction clutch, a support length of the transmission system is variable for carrying out engagements and disengagements of the friction clutch.

In this way, furthermore the result can be obtained that, upon the carrying out engagements and disengagements, the position of the force accumulator remains substantially unchanged or is changed only to a very slight extent, i.e. is not positively changed in order to effect disengagements. Rather, the change in length which is necessary in order to permit the clutch disk to lift off sufficiently from the counter pressure surface is obtained by changing the length of the transmission system.

In this connection, the transmission system is preferably arranged in the force transmission path between the force accumulator and the clutch disk.

The support length can, for instance. be an axial distance between a region of the support arrangement lying on the clutch disk and a region acted on by the force accumulator.

In accordance with another embodiment of the present invention, a friction clutch is provided which comprises a clutch disk that can be pressed against a counter pressure surface by a force accumulator, preferably a diaphragm spring, coil spring or the like, the force accumulator being supported with a first support end on a first component which is substantially not displaceable in a first direction of introduction of supporting force, and with a second support end developed for pressing the clutch disk in the direction against the counter pressure surface. In order to effect engagements and disengagements of the friction clutch, the pressure force exerted by the second support region can be conducted optionally in the direction of the clutch disk or in the direction of a second direction of introduction of a support force opposite, with respect to the first component, the first direction of introduction of the support force. Here also, by the optionally adjustable direction of the flow of force for the disengagement of the clutch, the clutch disk can be released from the action on it by the force accumulator.

In order to make this possible, an arrangement for switching the direction of flow of the force can, for instance, be provided that is constructed so as to conduct the force exerted by the force accumulator in the region of the second support end optionally in the direction of the clutch disk or in the direction of the second component.

The arrangement for the switching of the direction of flow of the force can, in one embodiment, be a transmission-lever arrangement having at least one first lever region associated with the force accumulator and at least one second lever region associated with the clutch disk. The transmission lever arrangement is arranged swingably on a structural part which is substantially not displaceable with respect to the second component in the second direction of introduction of the support force, or on the second component.

In automobile friction clutches there is generally the problem that with increased period of use the friction linings of the clutch disks also become worn and thus the axial length of the region of the clutch disk arranged between the counter pressure surface and, for instance, a pressing plate or the like, changes. This change, however, has the result that, also in the engaged condition, a change in position of the components pressing the clutch disk against the counter pressure surface takes place. From this, there can result a change in the force characteristic which is provided by the force accumulator, so that, for instance, the driver notes a change in the engagement and disengagement behavior over the life of the clutch.

In order to avoid this, the friction clutch of the invention furthermore comprises a wear-detection/compensation arrangement for compensating for the wear of friction linings of the clutch disk occurring upon operation of the friction clutch.

The wear-detection/compensation arrangement comprises a wear-compensation device arranged in the force transmission path between the force accumulator and the clutch disk, preferably between the force accumulator and a pressing plate. Thus, the length of the axial extent of the wear compensation device can be increased corresponding to a reduction in thickness of the clutch disk caused by wear, and in particular of the friction linings of the disk.

In yet another embodiment, which furthermore can be realized in a simple and reliably functioning manner, the wear compensation device comprises at least one compensation element displaceable in a circumferential direction around the axis of rotation of the clutch and/or in a radial direction. The compensation element is a compensation ring element, wedge element or the like, which has at least one inclined surface which can slide on a complementary inclined surface in order to increase the axial length of the wear-compensation device.

As an alternative, it is possible that the wear compensation device comprise at least one compensation element arranged on a pressing plate so that it is displaceable, along an axis which is preferably substantially parallel to the axis of rotation of the clutch, with respect to the pressing plate only in a direction pointing away from the clutch disk.

In a further embodiment of the invention, a transmission lever arrangement is provided on which the force accumulator on the one hand and a pressing plate or the like on the other hand are supported. The transmission lever arrangement comprises at least one lever element having two lever element sections which are swingable with respect to each other. The wear-compensation device comprises a compensation wedge element which can be inserted between the two lever element sections and is prestressed in the direction of insertion.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENT

Figure 1:
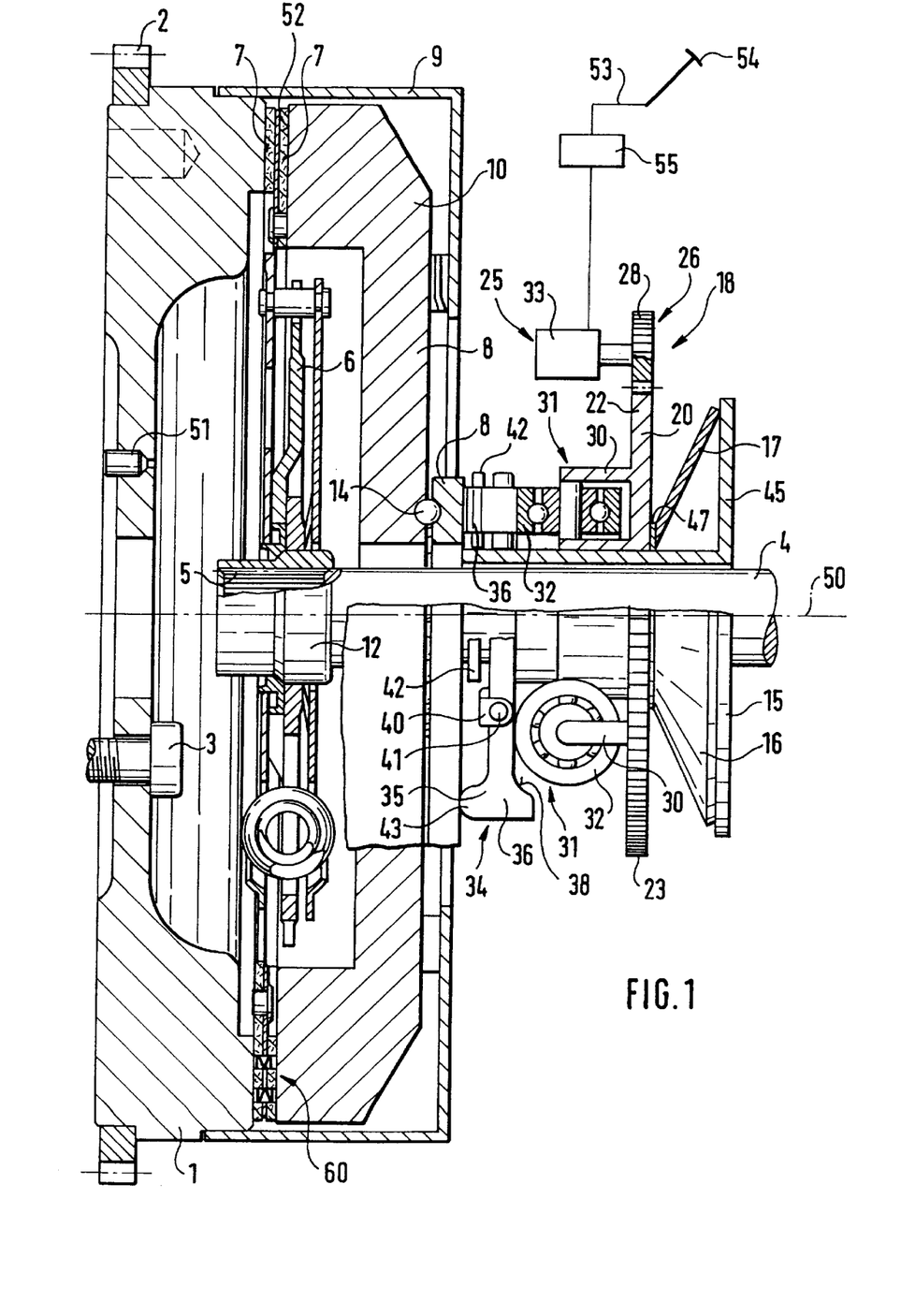
FIG. 1 shows a friction clutch, partially in section, with a tangential line to the displacement path substantially perpendicular to a disengager, the disengager being shown in cross section above the center line and in top view with the disengagement lever below the center line.

In FIG. 1, a flywheel mass 1 is centered via alignment pins 51 and fastening means 3 on a crankshaft (not shown) of an internal combustion engine of a motor vehicle. On a radially outer diameter, the flywheel mass 1 is surrounded by a clutch housing 9 which is adapted to receive a pressing plate 8 as well as a clutch disk 6 which, in its radially inner region, has a hub 12 with a toothing 5 that engages with a transmission shaft 4. In the radially outer region, the clutch disk 6 has friction linings 7. The friction lining 7 which faces away from the pressing plate 8 can be brought against a counter pressure surface 52 which is provided on the flywheel mass 1.

The pressing plate 8 consists of pressing elements 10, 11 which are arranged axially spaced from each other and receive between them an anti-friction bearing 14.

On a fixed holder part or bar 15 which is fastened for instance on a structural part (not further shown) of the motor vehicle, there is arranged a pressing means 16 such as, for instance, a diaphragm spring 17. The diaphragm spring 17 is supported, on the one hand, on a support wall 45 of the holder part 15 and, on the other hand, on a movement part 20 of a disengagement mechanism 34 of the disengager 18. The movement part 20 is formed by a wheel 22 having an outer toothing 23. Via this outer toothing 23, the wheel is in functional engagement with a drive element 26 of an actuating drive 25. The drive element 26 is constructed as a rack in the case of a linear actuating drive or as a pinion 28 in the case of a rotating actuating drive. The actuating drive 25 itself can be a hydraulic element or an electric motor 33. It is also possible, instead of the toothed connection between the wheel 22 and the drive element 26, to provide a frictional connection or a belt connection. In case of the use of an electric motor 33, the motor can be connected by an electric line 53 and a control 55 to a foot pedal 54 which is actuated by the driver for the engagement or disengagement of the clutch.

On the wheel 22, distributed over its circumference., there are a plurality of receivers 30 for in each case one bearing 32 each which, for reduction of friction, are preferably provided with anti-friction bodies. The bearing 32 cooperates with a disengagement lever 36 which is received swingably on the holder part 15 via a lever receiver 40 fastened on the holder part 15 and a shaft 41. On its side facing the bearing 32, the lever 36 has a cam 38 on which the bearing 32 rolls as soon as the wheel 22 is subjected to movement. In this way, the bearing 32 acts as a follower 31 for the cam 38.

In the lower half of FIG. 1, it can be seen that when the bearing 32 is above the shaft 41 on the lever receiver 40, the disengagement lever 38 is swung so that a pressure projection 43 facing the pressing plate 8 is lifted off from the pressing element 11 of the pressing plate 8. Conversely, when the bearing 32 is located below the lever receiver 40 in the figure, the pressing projection 43 is pressed under the action of the pressing means 18 against the pressing element 11, and this all the more the closer the bearing 32 comes to the deflection of the cam 38 in the direction towards the wheel 22. In the last-mentioned position, the force of the pressing means is applied, via the wheel 22, which is arranged displaceable on the holder part 15, and the bearing 32 connected with the wheel 22, to the disengagement lever 36 which urges the pressing plate 8 in the direction of the flywheel mass 1 and accordingly acts as a pressure element 35. In the other possible end position of the bearing 32, the disengagement lever 36 comes against a stationary stop 42, which is preferably provided on the holder part 15. In this position of the disengagement lever 30, the pressing force supplied by the pressing means 16 is transmitted to the stop 42 and accordingly remains within the holder part 15. A transmission of the pressing force to the pressing plate 8 is therefore prevented with this adjustment of the disengagement mechanism 34.

Axially between the pressing means 16 and the wheel 22, there is a slide disk 47 for Compensating for possible relative movements. It can preferably be coated with TEFLON (i.e., a synthetic flourine-containing resin).

The function of the disengager of the friction clutch of the invention is as follows:

The condition of deformation of the pressing means 16 is not substantially changed during engagement or disengagement. For disengagement, the foot pedal 54 is, for instance, depressed by the driver, whereupon a signal is sent out over the electric line 53 into the control 55 and passes via the continuation of the line 53 into the electric motor 33 whereupon the motor is accelerated for driving the wheel 22. The wheel 22 is initially in a position in which the bearing 32 is, referred to in FIG. 1, at the maximum distance from the center line 50 and engages into the associated rounding of the cam 38 on the disengagement lever 36 and thus under the action of the pressing means 18 with its pressing projection 43 presses firmly against the pressing element 11. The pressing element 11 in turn transmits the pressing force, via the anti-friction bearing 14 and the pressing element 10, to the friction linings 7 of the clutch disk 6 so that the friction linings 7 are clamped between the pressing element 10 and the counter-pressing surface 52 of the flywheel mass 1. By the previously described movement of the wheel 22 introduced by means of the electric motor 33, the bearing 32 rolls on the cam 38 of the disengagement lever 36 in the direction towards the center line 50 in FIG. 1. As soon as the shaft 41 has, upon this rolling movement, passed the lever receiver 40, the disengagement lever 36 is swung in the direction towards the stop 42 and the corresponding part of the disengagement lever 36 is thus brought to rest against the stop 42. In this position, the pressing projection 43 of the disengagement lever 36 is lifted off the pressing element 11 so that the pressing force of the pressing means 16 which has remained unchanged with respect to its state of deformation is taken up on the stop 42 and accordingly can no longer reach the pressing plate 8. In this way, the pressing element 10 is also free in the axial direction via the pressing element 11 and the anti-friction bearing 14, whereupon the clamping of the friction linings 7 of the clutch disk 6 between the pressing element and the counter-pressing surface 52 is eliminated.

For engagement, the foot pedal 54 is released, whereupon a signal is fed via the control 55 and the line 53 to the electric motor 33. This signal effects the driving of the motor 33 in the reverse direction of rotation and the wheel 22 is thus turned in a direction in which the bearing 32 is moved into its other end position, in which position it again brings about, via the cam 38, a transmission of the pressing force from the pressing means 16 via the bearing 32 to the disengagement lever 36 and from the lever 36, via its pressing projection 43, to the pressing element 11. The pressing element 11 is thereby connected via the anti-friction bearing 14 with the pressing element 10 so as to make a relative movement between the two pressing elements 10, 11 free of friction, since the pressing element 10 rotates with the clutch disk 6 and the flywheel mass 1, while the pressing element 11 is functionally connected, as free of rotation as possible, with the disengagement lever 36 of the disengager 18. For reasons of reduction in friction, the bearing 32, as can be noted from FIG. 1, is also preferably developed as an anti-friction bearing.

As shown at 60 in the lower half of FIG. 1, the clutch disk 6 can be provided in the region of its friction linings with a lining spring mounting. This spring mounting then acts in opposition to the force accumulator upon the effecting of engagements and disengagements so that, with a suitable selection or adaptation of the characteristic of the lining spring mounting 60 on the one hand, and the force characteristic of the force accumulator or the diaphragm spring 16 on the other hand, a disengagement behavior which is further improved, i.e. further optimized with respect to the required minimum expenditure of force, can be obtained.

Figure 2:
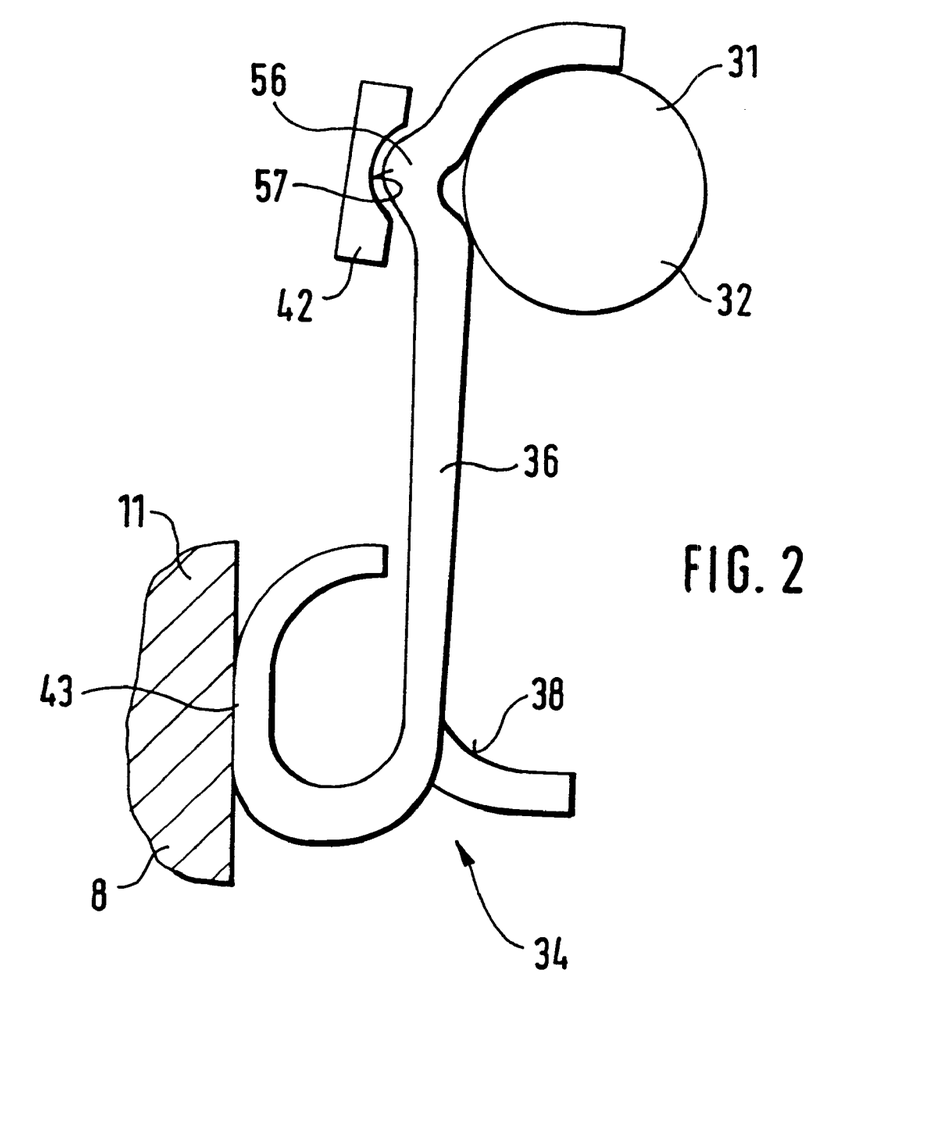
FIG. 2 shows a different embodiment of the disengagement lever.

FIG. 2 shows another embodiment of the disengagement lever 36 in which the lever 36 is not swingably mounted on an axle 41 but engages, via a projection 56, into a depression 57 in the stop 42 on the holder part 15 and is held resting against the stop 42 by the bearing 32 which serves as the follower 31. In this position of the follower 31, a pressing force produced by the pressing means 16 is introduced into the stop 42 while, after a movement by which the follower 31 is moved downwards in FIG. 2, the disengagement lever 36 is pressed in the direction towards the pressing element 11 of the pressing plate 8. In the position shown in FIG. 2, the friction clutch is accordingly disengaged while, upon transfer of the follower 31 into the position last described, it is engaged downwards. Otherwise, there is no difference between the embodiment of FIG. 2 and that of FIG. 1, so that no further description appears necessary.

FIGS. 3 to 6 show a further embodiment of a motor-vehicle friction clutch 100 in accordance with the invention which is based on the same functional principles as the embodiment described above but which is built structurally differently with respect to the production of the movement for the carrying out the disengagement and engagement processes.

Figure 4:
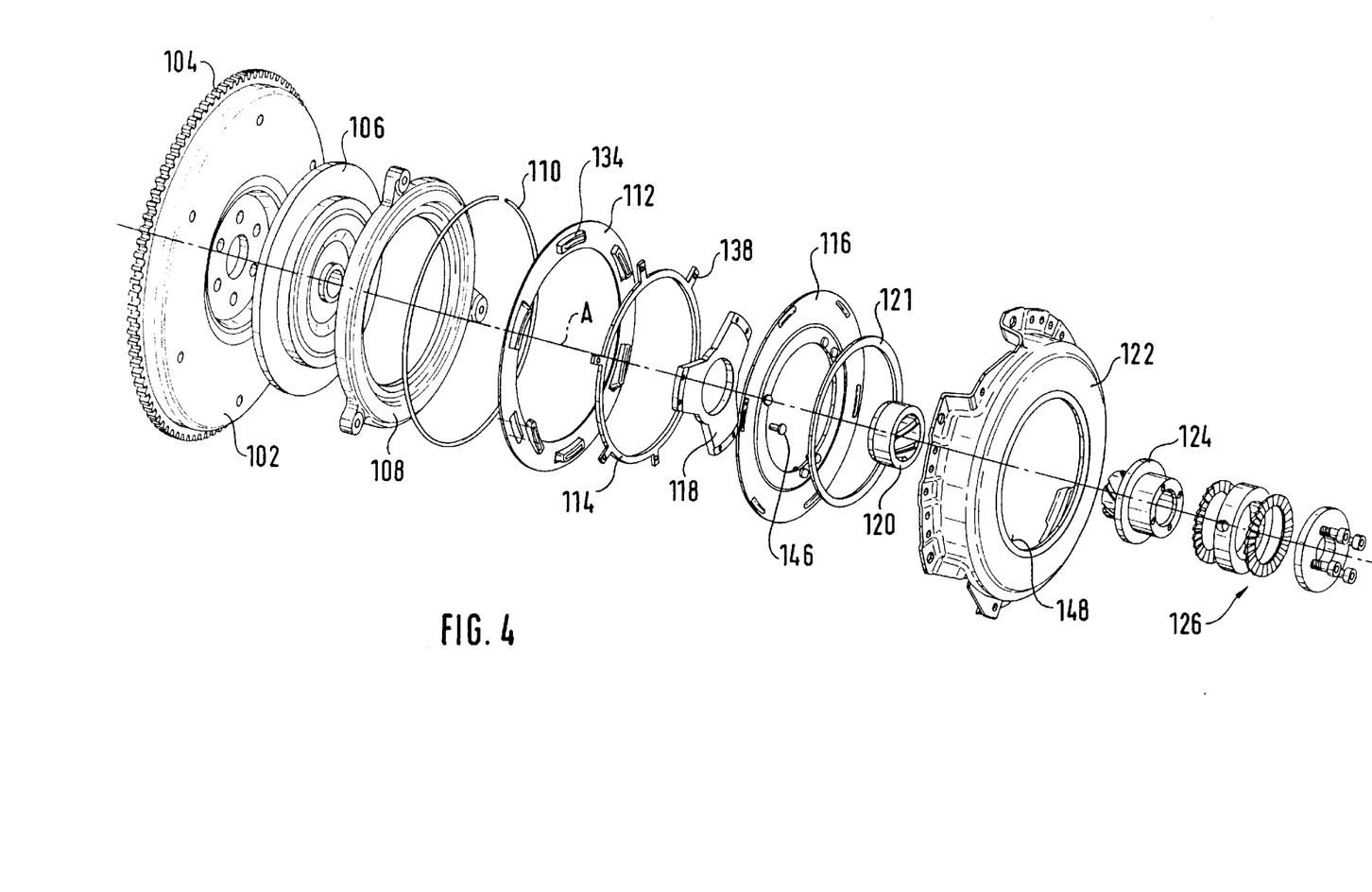
FIG. 4 is an exploded view of the friction clutch shown in FIG. 3.

With reference to FIG. 4, the individual components of this vehicle friction clutch 100 will now be described on the basis of the exploded view shown there.

Starting at the left in FIG. 4, there can first be noted the flywheel 102 which is provided with a starter gear rim 104 and is constructed in known manner for coupling to a crankshaft or the like of an internal combustion engine. In the sequence shown in the drawing, this is followed by a clutch disk 106 shown diagrammatically as a disk body which, in general, can have the same construction as the clutch disk shown in FIG. 1, i.e. can be developed with friction linings and possibly a lining spring mounting. Following the clutch disk 106 there is a pressing plate 108. The pressing plate 108 is followed by a bearing ring 110 on which a lever holder ring 112 can be supported axially in the manner described in detail below. A support element holder ring 114 is arranged axially between the lever holder ring 112 and a force accumulator 116 developed as a diaphragm spring. The force accumulator, i.e. the diaphragm spring 116, is firmly attached via a spring holder 118 to a ring 120 which has a coarse thread. Between a clutch housing 122 and the diaphragm spring 116, a bearing ring 121 is arranged, via which the diaphragm spring 116 is supported on the housing 122 turnable around an axis of rotation A. A disengagement ring 124 with complementary coarse toothing for engagement in the coarse toothing of the ring 120 is connected with a disengagement mechanism 126. The disengagement mechanism 126 may be of traditional construction so that it can be moved back and forth in the direction of the axis of rotation A in order to effect engagements and disengagements. The vehicle friction clutch formed by the components described above is shown, in assembled construction, in FIGS. 3 and 5. It can be seen that, in known manner, the housing 122 is firmly attached in a radially outer region to the flywheel 104. Within the housing 122 the pressing plate 108 is displaceable in the axial direction so that the clutch disk 106 can be clamped between it and the flywheel 104. It may again be pointed out here that in FIG. 5, in the same way as in FIGS. 3 and 4. the clutch disk 106 is shown in simplified manner as an annular body. It is obvious that the clutch disk 106 can bear friction linings in its radially outer region, possibly with a lining spring mounting.

Within the housing 122 there is an annular groove 128 in which the bearing ring 110 is contained. The lever holder ring 112 is supported on the bearing ring 110 which is fixed in this way on the housing 122. As can also be noted from FIGS. 3 and 4, the lever holder ring 112 has a plurality of U-shaped cutouts 130 directed in circumferential direction, i.e. open on one side. These cutouts 130 thus form tongues on which travel path elements 132 are fastened by rivets or the like. Together with the travel path elements 132, the tongues in each case form lever elements 134 which are swingable in the manner described below in the direction of the axis of rotation A by their attachment to the lever holder ring 112.

Figure 3:
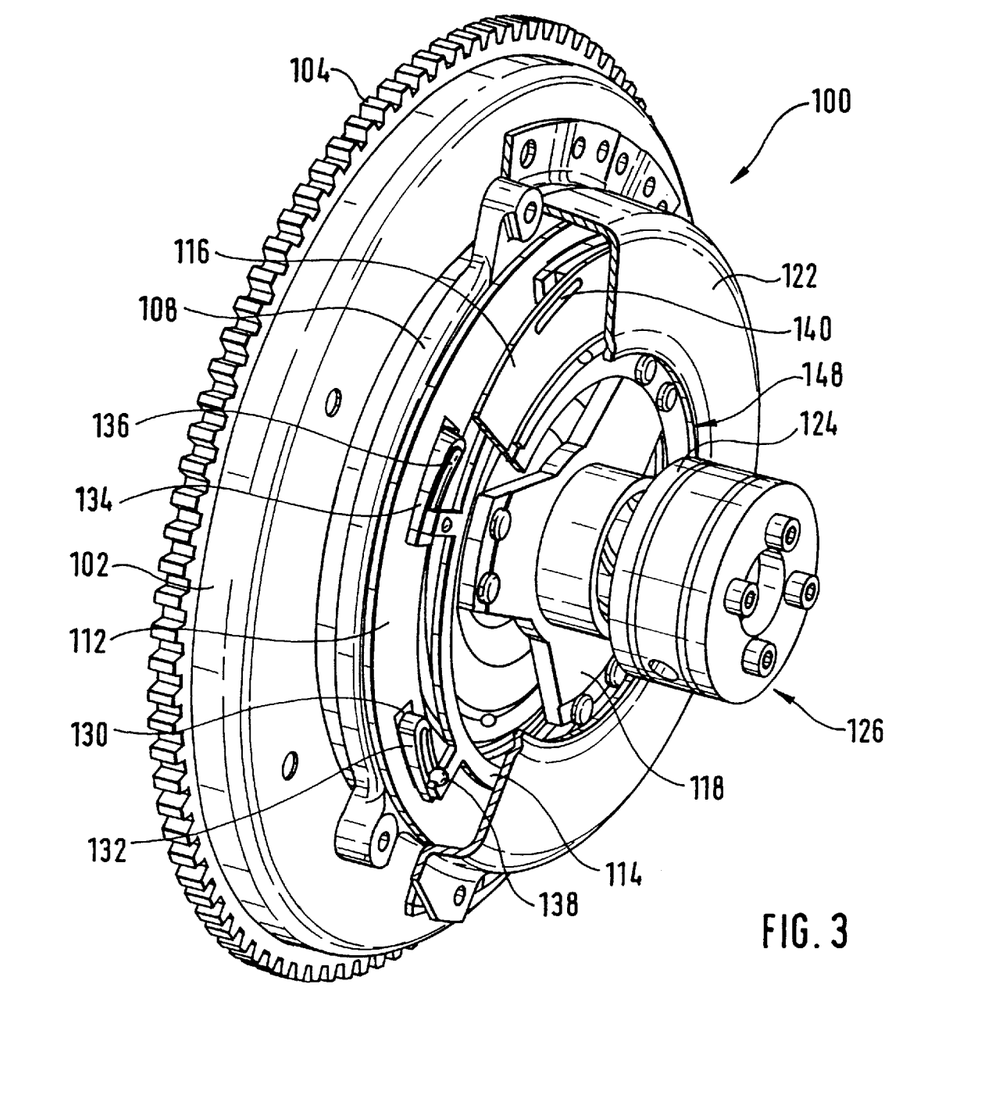
FIG. 3 is a perspective view, partially cut-away, showing an alternative embodiment of a friction clutch in accordance with the invention.

In the travel paths or displacement paths of the travel path elements 132 there are movable spherical or cylindrical elements 138 which are held by the support-element holding ring 114 in the manner of a cage. In other words, all balls 138 which travel in the different travel paths 136 of the different lever elements 134 and which form support elements for the diaphragm spring 116 are coupled to each other for joint movement by the support-element holder ring 114.

The diaphragm spring 116 is supported in the axial direction on the individual balls 138, the diaphragm spring 116 having corresponding travel paths 140. On its radially inner region, the diaphragm spring 116 is then supported on corresponding bearing elements or balls 142 which are held on the ring 120. Here also corresponding travel paths can be provided again in the diaphragm spring 116 and in the housing 122.

Still further radially inwards, the diaphragm spring 116 is firmly attached by rivets, screws or the like 146 to the spider-shaped spring holder 118. The latter, in its turn, is firmly connected, as already mentioned, to the ring 120. As can be noted in particular from FIGS. 3 and 4, the ring 120 extends through a central opening 148 in the housing 122, so that the disengagement ring 124 can engage into the ring 120.

Figure 5:
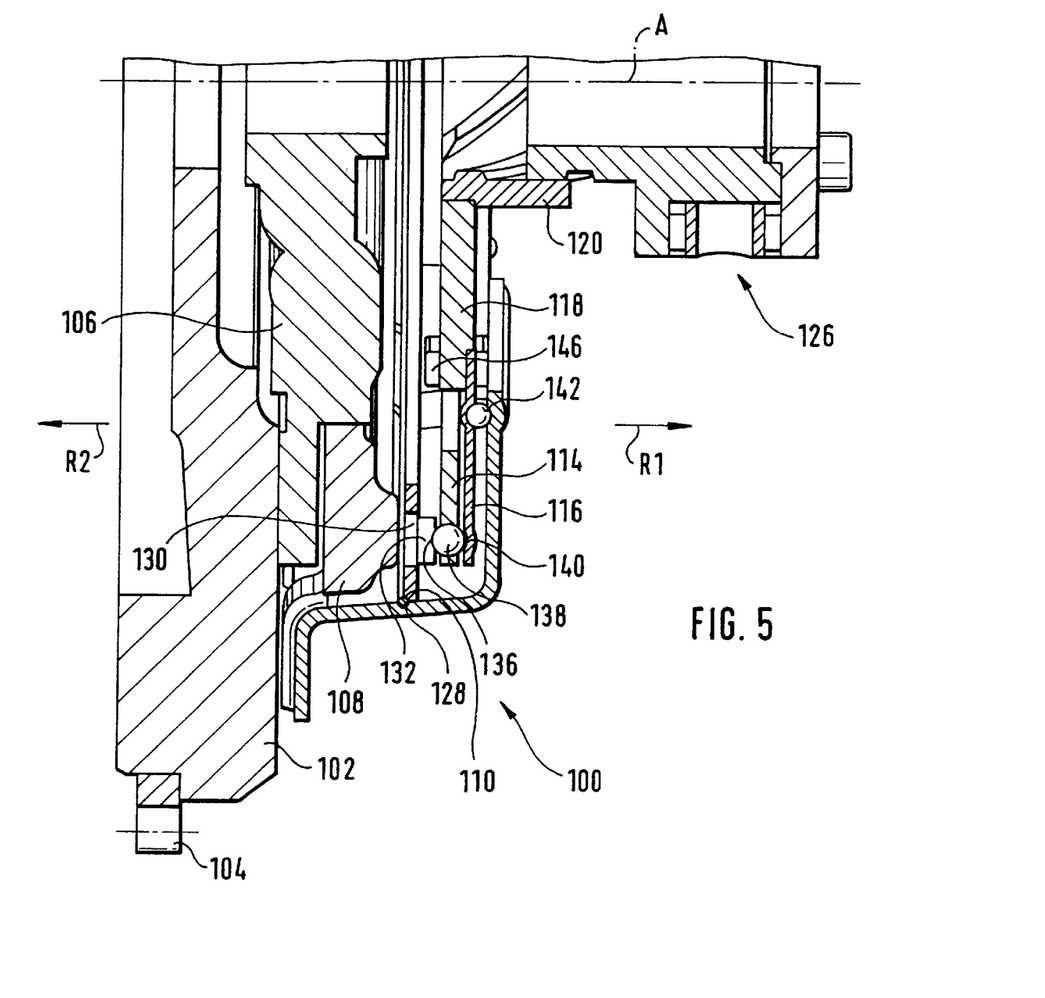
FIG. 5 is a partial longitudinal sectional view of the friction clutch shown in FIG. 3.

It can therefore be noted from FIG. 5 that in a first direction RI of introduction of force, the diaphragm spring 116 continuously acts on the housing 122 and in a direction R2 of introduction of force opposite the first direction Ri of introduction of force, in the manner described below either, in engaged condition, conducts the force in the direction towards the pressing plate 108 and thus towards the clutch disk 106 or, in disengaged condition, introduces the force via the lever holding ring 112 and the bearing ring 110 into the housing 122.

The manner of operation of the clutch 100 of the invention will be described below.

First of all, the disengaged condition of the clutch shown in FIG. 3 will be described. In this disengaged condition of the clutch, the spring holder 118 and thus the diaphragm spring 116 are, by means of the disengagement mechanism 126, the disengagement ring 124 and the ring 120 of the spring holder 118 and thus the diaphragm spring 116, displaced to the greatest possible extent in a counterclockwise direction relative to FIG. 3. This means that the balls 138 which are held on the support-element holding ring 114 lie on those ends of the corresponding displacement paths 136 which lie in the region, or above the attachment point, of the tongues bearing the travel path elements on the lever holding ring 112. This means that the diaphragm spring 116 acts directly on the lever holding ring 112 in its substantially non-deformable region so that a force return path over the housing 122 is produced. By this force return path which is produced and the relief of the pressing plate 108 caused thereby the plate 108 can, for instance, be moved by known tangential leaf springs away from the flywheel 102 and thus the clutch disk 106. This movement can be supported by a lining spring mounting of the clutch disk 106.

If now the clutch is to be engaged starting from this condition, then the disengagement mechanism 126 is displaced axially, i.e. it is pulled away upwards from the housing 122 relative to FIG. 3. By this axial displacement of the disengagement mechanism 126 and thus of the disengagement ring 124, the ring 120 is placed in rotation in a positive manner so that it turns in a clockwise direction in FIG. 3. This has the result that the diaphragm spring 116 also turns in a clockwise direction, the balls 138 rolling, in the case of this rotation, in the travel paths 136 of the lever elements 134 and the corresponding travel paths 140 of the diaphragm spring 116. This turning movement continues until the balls 138 have arrived at, in each case, the other ends of the travel paths 136, 140. Since the travel path elements 132 are wedge shaped, i.e. their thickness increases in the direction away from the region provided by the attachment of the rings to the lever holding ring 112, the lever elements 134 are now swung by the pressing plate 116 in the direction towards the pressing plate 108. As a result, the diaphragm spring 108 is pressed against the clutch disk 106 and the clutch disk 106 is clamped between the pressing plate 108 and the flywheel 102.

The kinematics upon transition from disengaged condition to engaged condition will now be explained again with reference to FIGS. 6a) to 6c). First of all, FIG. 6a) shows the disengaged condition. In this condition, the diaphragm spring 116 acts on the lever elements 134 approximately in the region of the attachment thereof to the lever holding ring 112, which region is marked S in FIG. 6. It can be seen that in the disengaged condition a lever length of a lever region, provided by the lever element 134, of a lever region 150 associated with the diaphragm spring is equal to zero, while lever length $L_2$ of a lever region 152 associated with the pressing plate, i.e. clutch disk, has a length $L_2$. This means that the force $F_M$ exerted by the diaphragm spring 116 is introduced completely into the swing point S and thus into the housing 122, while possibly a force $F_A$ exerted by the pressing plate 108 in the opposite direction, caused for instance by tangential leaf springs or a lining spring mounting, swings the lever elements 134 upward in FIG. 5. If now, upon engagement, the rotary movement described above takes place, then the point of impact of the force is shifted by the diaphragm spring 116, i.e. the force arrow designated $F_M$ in FIG. 6 shifts increasingly away from the swing region S. The lever length $L_1$ of the lever region 150 associated with the diaphragm spring 116 is then increased. The lever length $L_2$ of the lever region 152 associated with the clutch disk 106 or pressing plate 108, on the other hand, remains unchanged. Corresponding to the changing lever ratio $L_1/L_2$, the action of the force with which the diaphragm spring 116 clamps the clutch disk 106 between the pressing plate 108 and flywheel 102 also increases. In the engaged condition, shown in FIG. 6c), the lever lengths $L_1$ and $L_2$ are equal so that here we have a lever ratio of 1:1. It is pointed out that in the same way the point of attack of the lever region 150 by the diaphragm spring 116 can lie still further to the right than shown in FIG. 6c) so that a lever ratio greater than 1 is obtained.

Figure 6A:
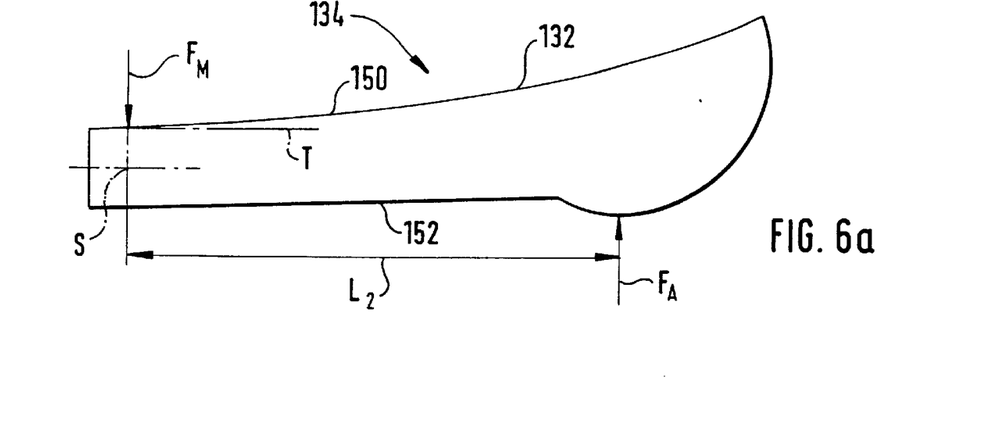
FIGS. 6a–c show a lever element of the friction clutch shown in FIGS. 3 to 5, FIGS. a) to c) showing different states of actuation.
Figure 6B:
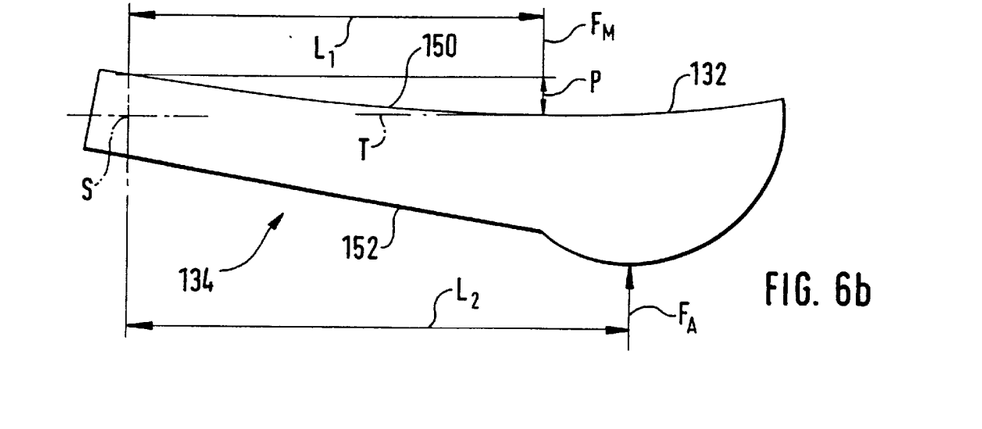
Figure 6C:
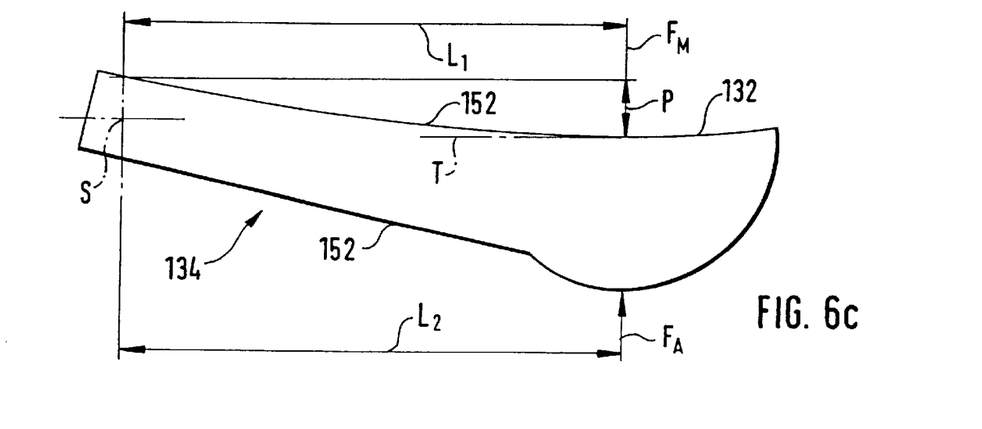

In FIG. 6, furthermore, in each case a line T tangential to the path of displacement or travel path 136 of the lever element 134 is shown. The curvature, i.e. the course of the travel path 136, is selected so that for all swung positions of the clutch, i.e. all conditions between disengaged and engaged, the tangential line at the point at which the lever region 150 is acted on at the time by the diaphragm spring 116 is perpendicular to the direction of impact of the force $F_M$ of the diaphragm spring 116. This has the result that there are no components of displacement force produced by a possible inclined direction of said force which lead to an automatic, positive turning of the diaphragm spring 116 in any direction. The reason for this special configuration of the displacement path 136 at the lever region 152 is that in this way in all positions only a very slight expenditure of force is necessary in order to turn the diaphragm spring 116 further in a direction. It is essential in this connection, however, that in both directions of turning, the same expenditure of force is then necessary. To be sure, such a construction of the lever elements 134 has the result that, in the transition from the disengaged to the engaged condition, the surface region of the lever element or elements 134 which is acted on by the diaphragm spring 116 comes increasingly closer to the clutch disk, i.e. the diaphragm spring 116 is relaxed to a given extent, as can be noted by the increase in the distance P in FIGS. 6b) and the 6c). This slight relaxation of the diaphragm spring 116 is, however, accepted in view of the minimum force then necessary for the turning, since then the force required for disengagement is still determined essentially by the frictional forces to be overcome. In every case, it can be noted that, for the disengagement of the clutch, the diaphragm spring 116 is not changed in its position but the lever ratio of the lever regions 150, 152 to each other is changed in order in this way to change the force introduced by the diaphragm spring 116 by an amount corresponding to the lever ratio. This corresponds to the controlled deformation of the diaphragm spring 116 for carrying out disengagement processes in traditional automobile friction clutches.

It may again be pointed out here that it may also be advantageous to tilt the tangential lines L in FIG. 6 slightly in a clockwise direction so that, in every condition, a component of force is present which moves the clutch automatically into the engaged condition. In the same way, a tilting of the tangential lines T in a counterclockwise direction is also possible if this is desired. This leads to the clutch being moved automatically into its disengaged condition. Furthermore, in principle, it is possible to construct the lever elements so that, at the transition between engaged and disengaged conditions, the diaphragm spring 116 is practically not deformed at all.

The above description shows that the clutch shown in FIGS. 3 to 6 has the following substantial structural and operational principles:

1. For effecting engagements and disengagements, the lever ratio of a first lever region with which the diaphragm spring is associated or by which it is acted on changes to a lever length of a second lever region which is associated with the clutch disk or by which it is acted on. This means that the application and removal of load is caused by a specific adjustment of this lever ratio so that at least when the lever length of the first lever region associated with the diaphragm spring or of all first lever regions associated with the diaphragm spring is within the region of 0, the diaphragm spring no longer acts on the clutch disk. This corresponds to a condition in traditional clutches in which, by a targeted deformation of the diaphragm spring, the action of the force thereof on the clutch disk or pressing plate has been increasingly reduced and eliminated.

2. For effecting engagements and disengagements essentially no a change in position of the diaphragm spring is utilized as in the case of traditional clutches, in which the axial structural length of the diaphragm spring is shortened in order to provide clearance for the clutch disk. Instead, the support length of a support arrangement acting between diaphragm spring and clutch disk is changed. This can be noted, in particular, in FIGS. 6a) to 6c).

3. The loading and release of the clutch disk or pressing plate by the diaphragm spring is not changed by the fact that, as a result of deformation of the diaphragm spring the action of its force is changed, but the pressure force exerted by the diaphragm spring is caused by a targeted direction of flow of the force. In other words, for switching between the engaged and the disengaged condition, the flow path of the force is switched from action on the clutch disk to action on a structural part which is fixed with respect to the housing or on the housing itself. There is thus a force return path and a closed force circuit via the housing. In other words, those components which are acted on by the diaphragm spring 116 are, in the engaged condition, components which are displaceable with respect to each other in the direction of introduction of the force and, in disengaged condition, components which are not displaceable with respect to each other in the direction of introduction of the force.

It is pointed out here that all the principles described above are also realized with the clutch construction described with reference to FIGS. 1 and 2.

Another embodiment of the clutch of the invention will be described below with reference to FIGS. 7 to 9, wherein it is seen to it, in addition, that wear of the friction linings of the clutch disk which occurs upon operation does not lead to a change in the force characteristic of the clutch.

In FIG. 7 there can again be noted the clutch housing 122 on which the force accumulator, i.e. the diaphragm spring 116, is supported. The diaphragm spring 116 acts on the support elements 138 which are formed in this embodiment for instance by rollers 138 which rest on the support element holding ring 114. Furthermore, again, lever elements 134 are provided which are swingably mounted on a lever holding ring, not shown in FIG. 7. One structural difference is that, in the embodiment shown in FIG. 7, the diaphragm spring 116 is not turned in order to effect engagements and disengagements but, rather, the support element holding ring 114 is turned in the circumferential direction in order in this way to displace the support elements 138 with respect to diaphragm spring 116 on the one hand and lever element 134 on the other hand in the direction of the arrow D. As the support elements 138 approach the region of swing S of the lever elements 134, the lever elements 134 are increasingly swung in the direction towards the pressing plate 108 so that again the engagement and disengagement characteristic described above is obtained.

Figure 7:
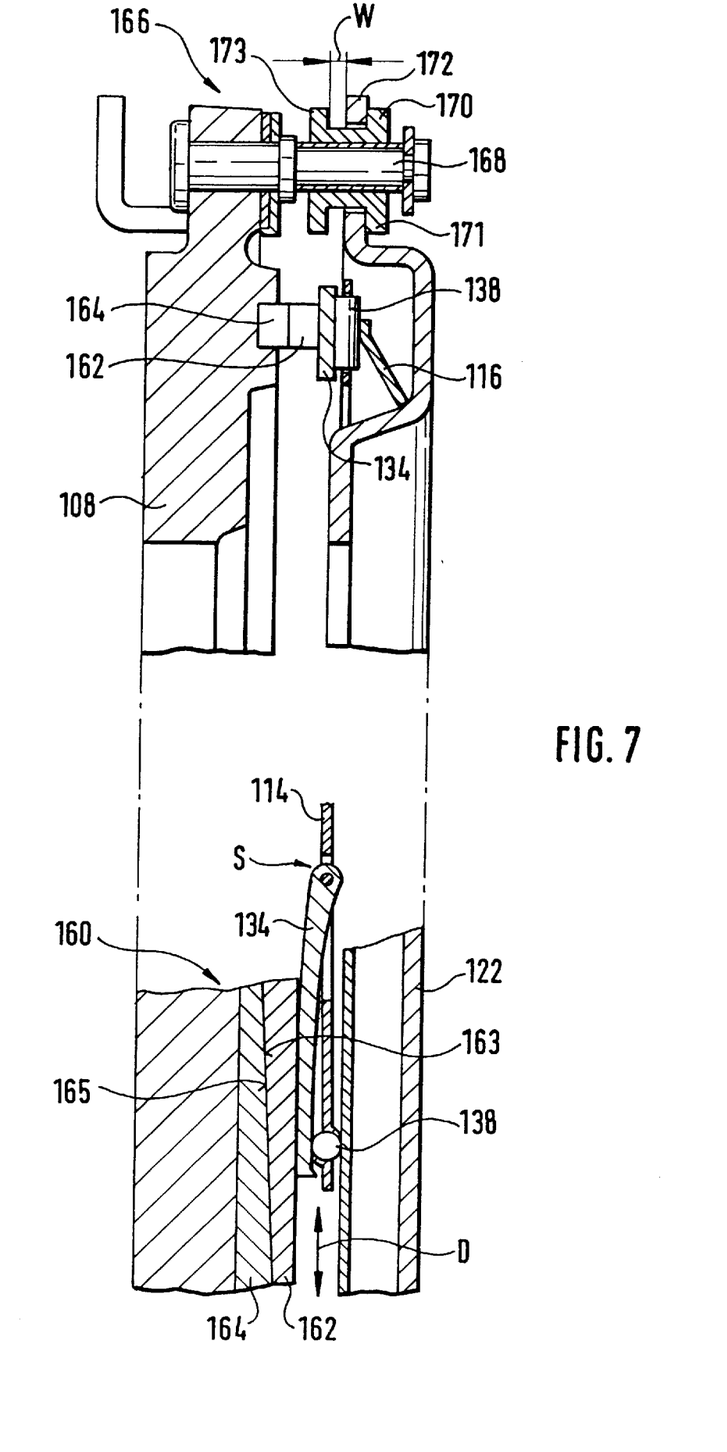
FIGS. 7–9 are schematic partial longitudinal sections which show different embodiments of friction clutches with automatic wear compensation.

It can be noted in FIG. 7 that the lever elements 134 act on a wear compensation device 160, which, in the embodiment shown, is constructed as compensation elements with two adjustment rings 162. 164 which are displaceable in the circumferential direction with respect to each other. The rings 162, 164 are biased with respect to each other in circumferential direction by biasing elements so that with the inclined surfaces 163, 165 lying against each other which can be noted in FIG. 7, they can slide on one another and in this way lengthen the axial length of the wear compensation device 160. It may be pointed out here that instead of the rings 162, 164 which move circumferentially, there can also be provided individual wedge elements which then can move either in the circumferential direction or in the radial direction. Also, it is sufficient to make in each case a single one of the ring or wedge elements displaceable. The other wedge or ring element can either be stationary with respect to the pressing plate 108 or the lever elements 134, or it can be integrated in those components themselves. In the engaged condition, the wear compensation device 160 is acted on by the diaphragm spring 116 so that a relative turning of the two adjustment rings 162, 164 cannot take place.

It can furthermore be noted in FIG. 7 that at least one so-called play-former 166 is provided on the pressing plate 108. The play former 166 surrounds a bolt 168 which is fastened to the pressing plate 108 and is held by frictional engagement within a sleeve 170. The sleeve 170 is freely displaceable in the axial direction with a predetermined displacement path "W" in an opening in a radial projection 172 of the housing 122. The displacement path "W" is dimensioned so that it corresponds to the clearance for the clutch disk to be provided upon the effecting of engagements and disengagements. This means that the pressing plate 108 can move under the initial stress of tangential leaf springs or the like upon the effecting of engagements and disengagements by the displacement path "W". Further movement, for instance towards the housing 122, is prevented by a radial projection 173 on the sleeve 170.

If wear of the friction linings of the clutch disk occurs, then the stroke to be carried out by the pressing plate 108 for the engagement of the clutch is greater than the path "W". In other words, already before the pressing plate 108 rests against the clutch disk 106, the radial projection 171 of the sleeve 170 which is arranged on the outer side of the housing 122 comes against the housing 122 and can then no longer be moved further. Under the force exerted by the diaphragm spring 116, the pressing plate 108, however, moves together with the bolt or bolts 168 further away from the housing 122, in which connection, in this way, the bolts 168 which are held with frictional lock in the sleeves 170 are positively displaced with respect to the sleeves 170. Upon a subsequent disengagement, the pressing plate 108 can, however, move back again merely by the path "W" in the direction towards the housing 122, so that, after passing over the path "W" and the further continuing disengagement process, i.e. turning of the support element holding ring 114, the action of the diaphragm spring 116 on the wear compensation device 160 is done away with, and the adjustment rings 162. 164, which are then no longer acted on by load, can be turned slightly with respect to each other in order to compensate for wear until the ring 162 again strikes the levers 134 and is prevented from turning further by them and the diaphragm spring 116. In this way precisely that wear which previously led to a relative displacement between the bolts 168 and the sleeves 170 is compensated for.

By the provision of the wear- compensation device 160, together with the play-former 166 or possibly several play-formers 166, assurance can be had that the diaphragm spring 116 is always held in its optimal operating range or that the swung positions of the individual lever elements 134 in their engaged or disengaged condition remain in each case constant so that the disengagements and engagements initiated by the turning of the support element holding ring 114 also remain unchanged for the entire operating life of a clutch constructed in this manner.

It may be pointed out here that the play-former 166 can be constructed in different ways and that the embodiment shown is merely one example.

Figure 8:
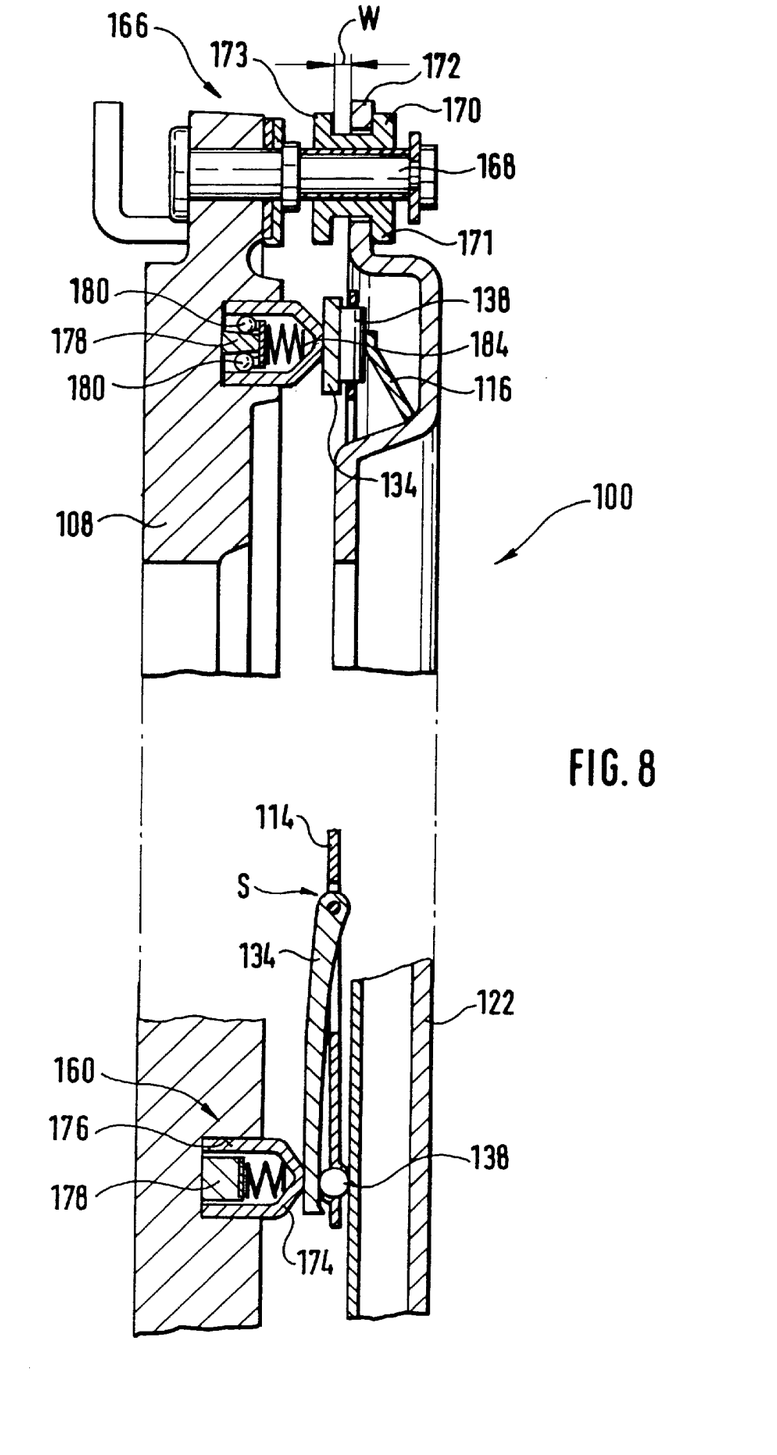

FIG. 8 shows an alternative embodiment of the wear-compensation device 160. The rest of the construction of the clutch 100 shown there corresponds to the construction shown in FIG. 7 and described with reference to FIG. 7, so that this need not be described further below.

The wear-compensation device 160 comprises, in FIG. 8, associated with each lever element 134, a cap-like readjustment or compensation element 174 which extends in part into a recess 176 in the pressing plate 108. Furthermore, a wedge-shaped blocking element 178 is provided in the recess 176, i.e. on the bottom of the recess 176. On both wedge surfaces of the blocking element 178 there are supported balls 180, rollers or the like which furthermore rest on the inner wall of the hollow adjustment elements 174. The adjustment elements 174 are furthermore prestressed by spring elements 184 in the direction towards the housing 122. Upon the action thereon of the diaphragm spring 116, the adjustment elements 174 are pressed in the direction towards the pressing plate 108, in which connection the balls 180 are clamped between the blocking element 178 and the adjustment element 174 and thus prevent a displacement of the readjustment elements 174 in this direction. A release from load of the adjustment elements 174 which has been described above and takes place upon disengagement has the result that the spring elements 184 press them against the housing 122, movement of the adjustment elements 174 not being prevented by the balls 180 in this direction of movement. Only a following action on the adjustment elements 174 by the diaphragm spring 116 or the lever elements 134 leads to the renewed clamping of the balls 180, but in this condition, the adjustment elements 174 are displaced slightly towards the housing 122 with respect to the pressing plate 108. This displacement again corresponds to the wear of friction linings established previously by relative displacement between bolts 168 and sleeve 170.

Figure 9:
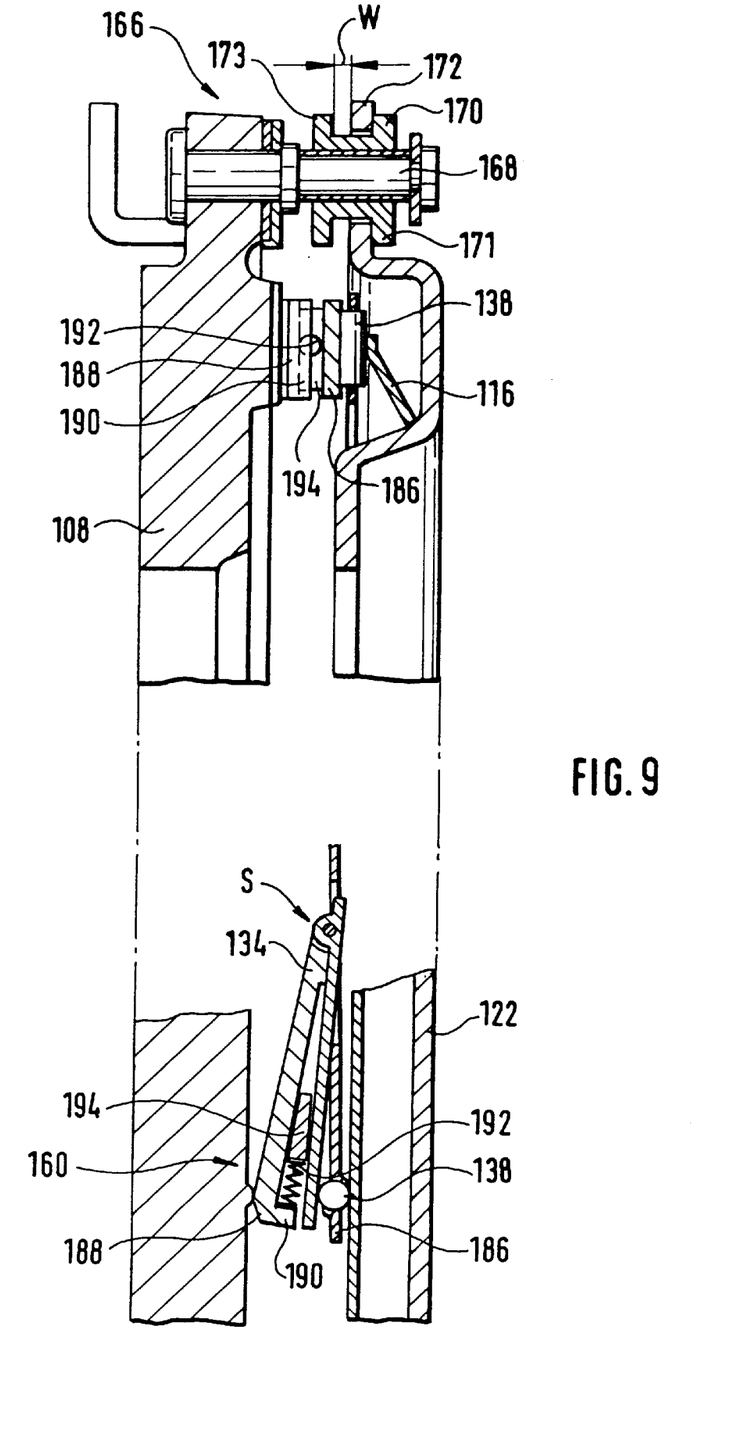

In the embodiment shown in FIG. 9, the lever elements 134 are constructed in two parts. The lever elements 134 comprise two lever element sections 186, 188, which are held swingable with respect to each other in the region of swing S of the lever elements 134. The lever element section 188 has, in its region remote from the region of swing S, a support section 190 on which a spring element 192 is supported. The spring element 192 acts on a displacement wedge element 194 and presses it in the direction towards the region of swing S.

If, when wear occurs, displacement of the pressing plate 108 upon disengagement is held up again by the play-former 166 after passage over the path "W" and if, in this connection, each of the lever elements 134 is released at least for a short time from the action of force by the diaphragm spring 116, then, in a corresponding manner, the two lever-element sections 186, 188 are released with respect to each other for swinging movement and the spring element 122 can move the displacement wedge element 194 in the direction towards the region of swing S. The movement stops until the lever element section 186 again comes against the support elements 138 and the lever element section 188 strikes the pressing plate 108. In this case, also, the wear noted previously by the play-former 166 or the play-formers 166 has then been compensated for by an increase of the axial length of the wear compensation device 160, which is integrated, in this embodiment, into the lever elements 134.

The number of play-formers and/or compensation elements can be selected in accordance with the requirements.

It is pointed out that the construction of the wear compensation device and the construction of the play-former or play-formers is independent of the rest of the development of the clutch. In other words, each of the clutches described and shown above can be combined with the wear compensation devices shown in FIGS. 7 to 9.

The invention is not limited by the embodiments described above which are presented as examples only but can be modified in various ways within the scope of protection defined by the appended patent claims.

We claim:

1. A friction clutch comprising:

at least one flywheel mass having a counter pressure surface;

a clutch housing mounted to the flywheel mass;

a pressing plate arranged in the clutch housing;

a clutch disk arranged between the pressing plate and the flywheel mass;

means containing stored pressing force for pressing the pressing plate against the counter pressure surface;

a disengager assembly operatively arranged to move the pressing plate so as to selectively functionally connect and separate the pressing and the clutch disk;

a disengagement mechanism that connects the disengager assembly with the pressing plate, the disengagement mechanism including a movable pressure element; and a movement part operatively arranged to move the disengagement mechanism so that the pressure element engages the pressing plate, whereby the pressure element is moved out of a first position, in which a pressing force of the pressing means is blocked from the pressing plate, into a second position in which the pressure element conducts the pressing force from the pressing means to the pressing plate.

2. A friction clutch according to claim 1, wherein the disengagement mechanism is arranged axially between the pressing means and the pressing plate and is operatively configured and arranged to conduct pressing force to the pressing plate due to a change in position of the pressure element caused by movement of the movement part.

3. A friction clutch according to claim 1, wherein the pressure element is a disengagement lever pivotally mounted on an axle at an angle to a center axis of the pressing plate.

4. A pressing clutch according to claim 1, wherein the plate includes two pressing elements arranged axially behind and turnable relative to one another.

5. A friction clutch according to claim 4, and further comprising an anti-friction bearing arranged to connect the two pressing elements together.

6. A friction clutch according to claim 1, wherein the pressure element has a pressing projection arranged and configured to act on the pressing plate.

7. A friction clutch according to claim 1, and further comprising a holder part fixed so as to surround a transmission shaft, the and the pressing means being arranged on the holder part.

8. A friction clutch according to claim 7, wherein the movement part is rotatably mounted on the holder part.

9. A friction clutch according to claim 8, wherein the holder part includes a stationary stop, and a support wall that supports one side of the pressing means, an opposite side of the pressing means being arranged to act on the movement part of the disengagement mechanism, the pressure element of the disengagement mechanism being arranged to rest, with intermittent transfer of axial force from the pressure means to the pressing plate, against the stationary stop.

10. A friction clutch, comprising:

at least one flywheel mass having a counter pressure surface;

a clutch housing mounted to the flywheel mass;

a pressing plate arranged in the clutch housing;

clutch disk arranged between the pressing plate and the flywheel mass;

means for pressing the pressing plate against the counter pressure surface;

a disengager assembly operatively arranged to move the pressing plate so as to selectively functionally connect and separate the pressing plate and the clutch disk;

a disengagement mechanism that connects the disengager assembly with the pressing plate, the disengagement mechanism including a movable pressure element;

a movement part operatively arranged to move the disengagement mechanism so that the pressure element engages the pressing plate, whereby the pressure element is moved out of a first position, in which a pressing force of the pressing means is blocked from the pressing plate, into a second position in which the pressure element conducts the pressing force from the pressing means to the pressing plate, the disengagement mechanism being arranged axially between the pressing means and the pressing plate and being operatively configured and arranged to conduct pressing force to the pressing plate due to a change in position of the pressure element caused by movement of the movement part, the pressure element of the disengagement mechanism having, on a side facing the pressing means, a cam with an inclination in a lengthwise direction of a center axis of the pressing plate; and a follower element driveably connected with the movement part and movable along the cam upon movement of the movement part.

11. A friction clutch according to claim 10, wherein the follower element is a bearing.

12. A friction clutch according to claim 10, wherein the movement part of the disengagement mechanism is configured to permit the introduction of movement by the movement part substantially perpendicular to the center axis of the pressing plate.

13. A friction clutch according to claim 12, wherein the disengager assembly includes an actuator drive having a drive element, the movement part being a wheel connected to the drive element of the actuator drive.

14. A friction clutch according to claim 13, wherein the actuator drive is an electric motor and the drive element is a pinion, the wheel having an outer toothing into which the pinion engages.

15. A friction clutch according to claim 14, and further comprising a clutch pedal, and a control element and electric cable connection arranged to functionally connect the actuator drive with the clutch pedal.

* * * * *